D. C. HUBBARD.
Cotton Harvester.
No. 105,211.
Patented July 12, 1870.
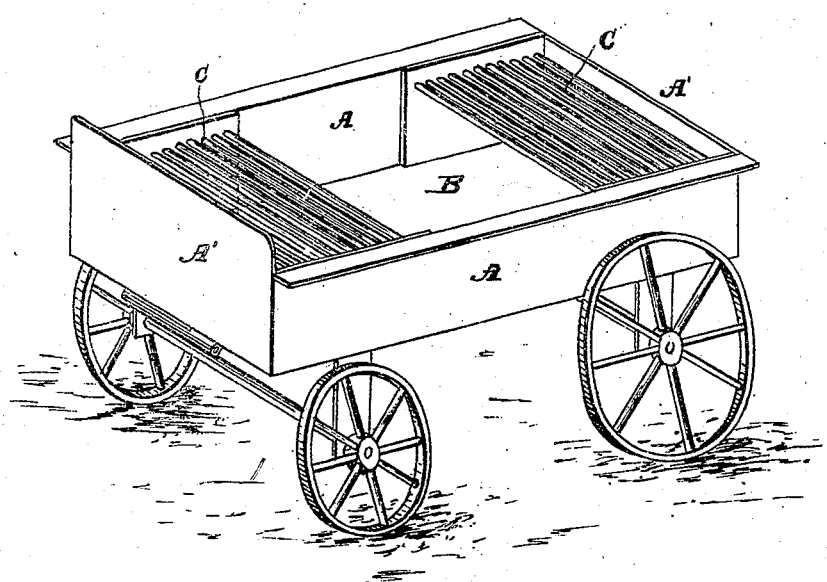
Witnesses:
Inventor:
Duncan C Hubbard

United States Patent Office.

DUNCAN CAMPBELL HUBBARD, OF POINT COUPEE PARISH, LOUISIANA.

Letters Patent No. 105,211, dated July 12, 1870.

IMPROVEMENT IN COTTON-HARVESTER.

The Schedule referred to in these Letters Patent and making part of the same.

I, DUNCAN CAMPBELL HUBBARD, of the Parish of Point Coupee, in the State of Louisiana, have discovered a certain Improved Mode of Gathering or Harvesting Cotton by thrashing the same from the bolls after the stalks are pulled down or pulled up, of which the following is a specification.

The object of this invention is to save the cotton annually lost by frost, insufficiency of hands, or the ravages of the caterpillar, substantially as hereinafter described.

The absence of leaves on the plants is a precedent condition to the use of my invention, for two reasons: first, because their presence would fill the cotton with trash, to wit, the broken leaves themselves; and, secondly, because so long as the leaves remain on the plants there will be immature bolls, which would be lost by the cutting of the plants. After the leaves have fallen, from being killed by frost, or have been eaten up by the worms, there can be no such loss, for experience has long proved that the effect produced by the loss of the leaves, no matter what the cause of such loss may have been, is to cause every boll at once to open that has reached a condition even approximating to maturity, so that there can be no loss whatever from the cutting of the stalks a few days after the leaves have gone from unopened bolls. On the contrary, there is an advantage gained by cutting them at this time, to wit, the clearing of the land at one and the same time with the harvesting of the cotton, instead of postponing, as is now universally the practice, the clearing operation until after all the cotton has been picked out.

A very simple, and perhaps the best means to effect my object, is illustrated by the drawing.

This consists of what may be called a wagon, having a straight body, open at top, and high sides and ends A A', across which, and at each end and at the top thereof, for a little less than one-quarter of the length, as shown, wires C are stretched about an inch or so apart. The middle section of the wagon is left perfectly open and unobstructed.

With such a machine, or its equivalent, the harvesting of cotton after the leaves are off the plants, is effected in a very simple manner, and with astonishing rapidity. Nor is it necessary for more than three men to be employed in the operation. More than four men cannot be employed with any advantage whatever.

The operation is as follows, to wit:

One man drives the machine, which may be drawn by one or two horses or mules, another walks ahead, and with a suitable implement, as, for example, an ordinary cane-knife, for cutting down sugar-cane, and cuts down the stalks at or about the surface of the ground, while the third man picks up the stalks, one at a time, steps to the side of the machine and strikes them on the near side thereof in such manner that all the cotton that is disengaged and thrown out of the bolls by the shock will fall into the body of the machine between the wires.

I have found by experience, for I harvested the whole of my crop of cotton last fall and winter with one of my machines, that one blow will nearly always precipitate all of the best of the cotton into the body of the machine, and not unfrequently every fiber from every boll. If, however, this should not be the case, whatever cotton may remain in the bolls is readily thrashed out by striking the stalks upon the wires, one blow being always sufficient, unless the bolls are not fully open and the cotton clings with unusual tenacity therein.

When full, the machine is driven to the gin-house or drying-house, or other suitable place of deposit, where it delivers the cotton, and then returns into the field for another load.

I claim as my invention—

The means herein described for harvesting cotton after the leaves are off the plants, by thrashing out the same, consisting of the receptacle A A' B, and wires C combined, substantially as described.

DUNCAN C. HUBBARD.

Witnesses:
EMILE H. LEVY,
F. R. PLACE.